United States Patent [19]
Nordlie

[11] 4,018,614
[45] Apr. 19, 1977

[54] CELSIAN-ZIRCONIA COMPOSITIONS

[75] Inventor: Lawrence A. Nordlie, Corning, N.Y.

[73] Assignee: Corning Glass Works, Corning, N.Y.

[22] Filed: Apr. 1, 1976

[21] Appl. No.: 672,632

[52] U.S. Cl. .................................. 106/57; 106/63; 106/73.4

[51] Int. Cl.[2] ........................................ C04B 35/48

[58] Field of Search ..................... 106/57, 63, 73.4

[56] References Cited

UNITED STATES PATENTS

| | | | |
|---|---|---|---|
| 3,473,938 | 10/1969 | Oberlin | 106/57 |
| 3,519,447 | 7/1970 | Adams et al. | 106/57 |
| 3,541,193 | 11/1970 | Adams | 106/57 |

FOREIGN PATENTS OR APPLICATIONS

| | | | |
|---|---|---|---|
| 1,227,819 | 10/1966 | Germany | 106/63 |

OTHER PUBLICATIONS

Mitev, T. et al. Chem. Abstracts 74 78953k (1971).

Primary Examiner—Helen M. McCarthy
Attorney, Agent, or Firm—Richard N. Wardell; Clarence R. Patty, Jr.

[57] ABSTRACT

Mismatched expansions of monoclinic celsian and zirconia crystals and the refractoriness of both phases in a sintered ceramic body result in highly refractory, microcracked and thermal shock resistant products. Avoidance of the higher expansion hexagonal form of celsian is desirable to obtain the better thermal shock resistance.

5 Claims, 2 Drawing Figures

CELSIAN-ZIRCONIA COMPOSITIONS

Background of the Invention

In fabricating ceramic products, there is generally a trade-off between refractoriness and thermal shock resistance in available compositions. This is so because the more refractory (higher use temperature without melting) materials tend to have higher coefficients of thermal expansion which means that the crystals are more disrupted by rapid temperature changes (thermal shock) and by thermal gradients within the fired composition.

During attempts at increasing the thermal shock resistance of ceramic compositions, it has been discovered that it is not necessary to lower the thermal expansion of the compositions. Instead, minute internal cracks (microcracks) can be initiated therein which improve the thermal shock resistance since the localized stresses caused by expansions and contractions within the composition may be relieved either by the propagation or closing of the microcracks. Of course, the strength of the composition may be reduced by the microcracking but, depending on the end use, this property may be relatively less important.

One way to initiate microcracking in a pure material is to introduce a second phase which has a much different expansion than the first material. After sintering such a mixture, a cooling thereof will result in differential contractions of the phases which causes microcracking between the phases. However, when selecting a second phase to accomplish the above, it is necessary to select a refractory phase which will not form a very low temperature eutectic composition with the first material or else the use temperature of the composition could be reduced considerably.

SUMMARY OF THE INVENTION

It is an object of the present invention to provide a sintered ceramic composition which has a high use temperature (high melting temperature) and which is physically resistant to rapid temperature changes.

In particular, it is an object of the present invention to provide a ceramic composition which can be formed into a porous, honeycombed matrix or similar form for use as a catalyst support in cyclical, high-temperature catalytic processes. Such honeycombed structures may also be made non-porous and be used, for example, as regenerative heat exchangers.

In accordance with the objectives, the invention is a thermal shock resistant, microcracked, sintered ceramic composition which has a melting temperature of at least about 1600° C (preferably at least about 1650° C), and consists essentially of, by weight on the oxide basis, 12.3–36.8% BaO, 8.1–24.5% $Al_2O_3$, 9.6–28.8% $SiO_2$ and 10–70% $ZrO_2$ and has celsian ($BaAl_2Si_2O_8$) and zirconia ($ZrO_2$) as its predominant phases.

The composition is preferably 30–90% celsian and 10–70% zirconia (more preferably 40–70% celsian and 30–60% zirconia), with the celsian and zirconia preferably amounting to at least 90%, and the celsian is preferably in the monoclinic form rather than the hexagonal form. The zirconia may be in monoclinic, tetragonal or cubic form, although the inversion to monoclinic upon cooling may increase microcracking.

DETAILED DESCRIPTION OF THE INVENTION

Sintered ceramic bodies consisting essentially of 30–90% celsian ($BaAl_2Si_2O_8$) and the balance zirconia have shown use temperatures of as high as about 1685° C. The use temperature is defined as a temperature at which a body may be held for a prolonged length of time (e.g. hours) without physical deformation associated with melting. Some of the compositions of the invention begin to melt at about 1685° C and it is suspected that certain other compositions nearer a $ZrO_2$-celsian eutectic may melt at lower temperatures, although this eutectic composition has not as yet been ascertained by the present inventor.

Good thermal shock resistance of the compositions of the invention has been found to relate to microcracking which is due to the thermal expansion mismatch of the fully developed celsian and zirconia phases. Preferably, the monoclinic celsian form is produced in the compositions of the invention since its expansion is about 35–40 $\times$ $10^{-7}$ in/in/° C compared with about 70–80 $\times$ $10^{-7}$ in/in/° C for the hexagonal celsian. The monoclinic zirconia has an expansion coefficient of about 80–90 $\times$ $10^{-7}$ in/in/° C so that cooling from sintering temperatures can cause microcracking between the monoclinic zirconia and either of the celsian forms. However, cracking is more easily induced with the monoclinic celsian because of the larger expansion mismatch with monoclinic zirconia. Cubic zirconia may have an expansion of about 100 $\times$ $10^{-7}$ in/in/° C and can therefore cause greater microcracking than monoclinic zirconia. On the other hand, the volume expansion associated with the inversion to monoclinic zirconia in unstabilized compositions may also increase microcracking. Therefore, presence of stabilized or unstabilized zirconia is a matter of choice. The inventor has, however, primarily produced monoclinic zirconia.

In fabricating the compositions of the invention, conventional ceramic raw materials and conventional ceramic batching, blending, and forming is prescribed. Extrusion of monolithic honeycombed matrices is preferred for use of the compositions in catalyst supports for high temperature catalytic processes. Description of preferred extrusion processes is amply given in U.S. Pat. No. 3,790,654, which is incorporated herein by reference.

The present inventor has found that in firing the formed bodies, a temperature of at least about 1400° C develops the celsian and zirconia phases from the raw materials but that sufficient grain growth to develop good microcracking and better thermal shock resistance is not completed until the firing temperature is about 1600° C with a 6 hour hold. On the other hand, the inventor has observed slumping in some of the compositions fired to about 1685° C and for these reasons prefers to sinter the compositions at about 1600°–1650° C.

Figure 1:
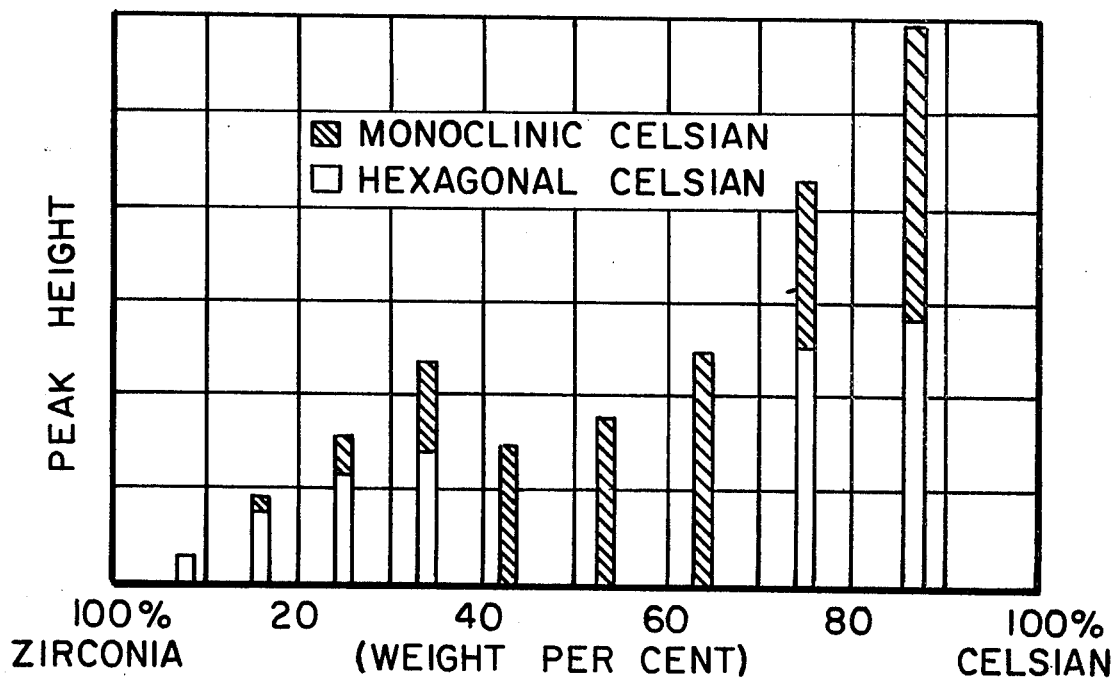

Looking at FIG. 1, it is seen the celsian crystal form of compositions in the range of 40–70% celsian (with the balance $ZrO_2$) is substantially all monoclinic. In developing the date of FIG. 1, bodies were formulated to yield the indicated compositions and were fired in an electric furnace to 1410° C at a heating rate of 25° C/hour and were thereafter refired to 1650° C for 6 hours in a gas kiln. X-ray diffraction patterns were obtained for the samples and the x-ray peak heights of selected peaks were measured to determine the relative content of monoclinic and hexagonal celsian in the samples. It can be seen in FIG. 1 that, even though the x-ray peak heights are not quantitative, compositions in the range of 40–70% celsian were substantially all in the monoclinic form, whereas the amount of hexagonal celsian apparently increased in bodies both higher and lower in celsian than the preferred 40–70% celsian bodies.

The inventor found that firing in non-reducing atmosphere up to at least some unascertained temperature is desirable to produce the maximum amount of monoclinic celsian. Hexagonal celsian seems to be preferentially formed in reducing atmospheres. Because of furnace limitations, the inventor was able to fire in a non-reducing (electric furnace) only up to about 1410° C and thereafter to peak firing temperatures in a gas-fired kiln (reducing atmosphere), but 1410° C appeared to produce complete monoclinic celsian within bodies having 40–70% celsian. Therefore, the unascertained critical temperature, below which a reducing atmosphere favors development of hexagonal celsian, appears to be below 1410° C. Additionally, even in the non-reducing atmosphere, the inventor has found that heating rates above about 25° C/hour also seem to increasingly favor the development of hexagonal celsian and he therefore prefers that heating rates remain not greater than about 25° C/hour.

In compositions outside the prefered range of 40–70% celsian, it is not clear that either the atmosphere or the heating rate affects the relative amounts of the celsian forms, although the inventor speculates that the same relationship would occur as in compositions within the preferred range. However, in all compositions, the bodies may be fired in reducing atmosphere if the celsian is pre-reacted to the monoclinic form and is then batched with the zirconia yielding materials and fired to sintering temperatures.

EXAMPLES OF THE PREFERRED EMBODIMENTS

EXAMPLE 1

Sintered bodies having the compositions displayed in FIG. 1 and disclosed in Table 1 were fabricated using raw materials such as barium sulfate, hydrated clay, silica, alumina, zirconia and zirconium hydroxide. The zirconium hydroxide addition, which was suggested to me by my coworkers, is used to increase the porosity of the final bodies to provide a more useful catalyst support body. The raw materials were all at least -325 Tyler mesh in size. For example, the sintered composition 7 of Table 1 is made from a raw batch of 27.19% Sparmite barium sulfate, 14.97% Georgia Kaolin Hydrite R, 6.08% Pennsylvania Glass Sand Supersil, 6.25% Alcoa A-2, 27.61% Zircoa A, and 17.17% Zr(OH)$_4$.

The raw material batches for all compositions were blended with extrusion aids, in this case 4% of Dow Chemical's Methocel 4000 (methyl cellulose) and 0.5% sodium stearate flakes, and water and were extruded into rods approximately 8 mm in diameter by 10 cm in length. The samples were dried and then fired in an electric furnace at 25° C/hour to 1410° C for 6 hours. The samples were then refired to 1650° C for 6 hours in a gas kiln.

The samples were analyzed by x-ray diffraction to qualitatively determine the crystal form of the celsian and the heights of resulting x-ray peaks for monoclinic and hexagonal celsian are plotted in FIG. 1. The coefficient of thermal expansion of each composition was also determined over the range of room temperature to 1000° C and is reported in Table 1 along with the chemical analyses of the sintered compositions calculated from the raw batch. Percentages are reported by weight on the oxide basis and on the phase basis.

It is noticed that the expansion is at a relative minimum in the range of 40–70% celsian (balance ZrO$_2$) bodies, wherein the monoclinic form is prevalent. The expansion also gradually diminishes toward the high celsian bodies since the expansions of both forms of celsian are considerably lower than zirconia.

TABLE I

| Fired Properties | Sample No. | | | | | | | | |
|---|---|---|---|---|---|---|---|---|---|
| | 1 | 2 | 3 | 4 | 5 | 6 | 7 | 8 | 9 |
| Phases | | | | | | | | | |
| Celsian (wt.%) | 8 | 16 | 25 | 34 | 43 | 53.5 | 64 | 75 | 87 |
| ZrO$_2$ (wt.%) | 92 | 84 | 75 | 66 | 57 | 46.5 | 36 | 25 | 13 |
| Calculated Oxide Constituents | | | | | | | | | |
| BaO (wt.%) | 3.3 | 6.6 | 10.2 | 13.9 | 17.5 | 21.8 | 26.1 | 30.6 | 35.5 |
| Al$_2$O$_3$ (wt.%) | 2.2 | 4.4 | 6.8 | 9.2 | 11.7 | 14.6 | 17.4 | 20.4 | 23.7 |
| SiO$_2$ (wt.%) | 2.6 | 5.2 | 8.0 | 10.9 | 13.8 | 17.1 | 20.5 | 24.0 | 27.8 |
| ZrO$_2$ (wt.%) | 92.0 | 84.0 | 75.0 | 66.0 | 57.0 | 46.5 | 36.0 | 25.0 | 13.0 |
| Coefficient of Thermal Expansion ($10^{-7}$ in/in/°C | | 65 | 60 | 56.5 | 50.5 | 46.5 | 40 | 50 | 50 |

Additional bar samples (about 6.5 × 13 × 76 mm in size) were prepared at 10% celsian increments from 10% – 90% celsian (90% – 10% zirconia), fired to 1420° C for 6 hours at 25°/hour in an electric furnace and refired to 1650° C for 6 hours in a gas-fired kiln. The bars were then broken under 4-point loading to determine their strength. The results were rather uniform in all compositions with the modulus of rupture being about 4000 psi but the minimum (around 2600–3600 psi) occurred in the 40–70% celsian compositions, possibly indicating that these compositions were more greatly microcracked due to the relatively higher monoclinic celsian content.

EXAMPLE 2

A raw batch was prepared using 33.6% barium sulfate, 18.6% hydrated clay, 8.5% silica, 7.8% alumina (-325 Tyler mesh), 21.0% zirconia (-325 Tyler mesh) and 10.5% zirconium hydroxide. The batch was blended with 4% Methocel 4000, 0.5% sodium stearate and water and then extruded into rods 8 mm in diameter by 10 cm long. Several samples were fired to each of four peak temperatures (1500° C, 1550° C, 1600° C and 1650° C) for 6 hours with a prefire to about 1400° C in the electric furnace.

The calculated phases in the fired samples were 67% celsian and 33% zirconia and the oxide analysis calculated from the batch materials was 27.3% BaO, 18.2% Al$_2$O$_3$, 21.4% SiO$_2$, and 33% ZrO$_2$. The samples fired to 1650° C had a porosity of 27.0%, an expansion coefficient of about $50 \times 10^{-7}$ in/in/° C and a melting temperature of about 1685° C.

A thermal shock test was derived to investigate the relative resistance of the samples to large temperature variations over short periods of time. In the test, all the samples were placed in a furnace and the temperature was raised to 1000° C in 100° increments. After 10 minutes at each 100° degree plateau, eight samples which had been fired at each peak firing temperature were drawn from the furnace and placed in room temperature water. The average modulus of rupture of each group of quenched samples was then determined and recorded in FIG. 2 as a function of the quench temperature (the temperature at which the samples were drawn from the furnace.)

Figure 2:
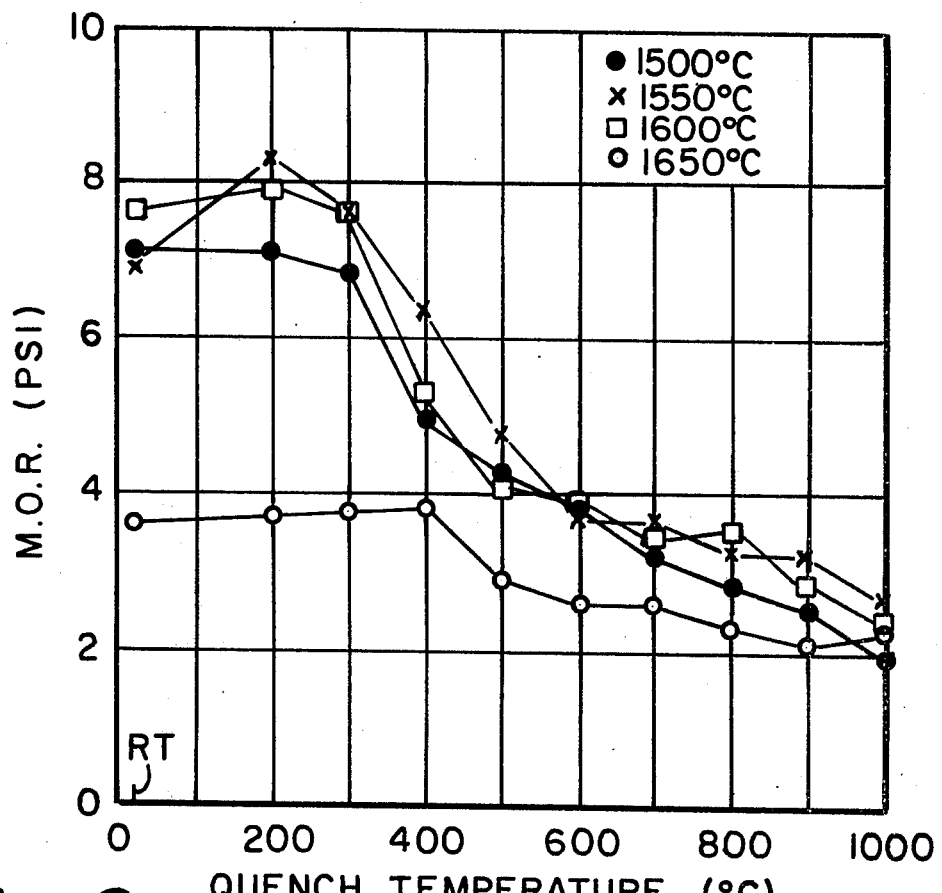

In FIG. 2 it can be seen that the three lower firing temperatures produce typical ceramic bodies which maintain strength up to a particular quench temperature and thereafter lose strength rather rapidly at higher quench temperatures due to increasingly destructive thermal stresses within the bodies. The samples fired to 1650° C, however, show behavior more typical of a microcracked sintered ceramic wherein the initial strength is low, but continues relatively unaffected by increasing thermal stresses brought about by higher quench temperatures. The 1650° C samples are more microcracked than the other samples because of the more rapid grain growth at higher temperatures and larger differential cooling (and crystal contraction) from the peak firing temperature.

EXAMPLE 3

Rod-shaped samples were formed and fired to the four temperatures as in Example 2, but using compositions of samples 4 and 9 of Example 1. These compositions are within the limits of the broad invention but are outside of the preferred range due to their reduced tendency to microcrack and to react completely to the monoclinic celsian form as shown in FIG. 1.

Samples from each of the firing schedules were reheated and then quenched from temperatures up to 1000° C at 100 degree intervals. The samples were then broken and their strengths calculated.

Samples of composition 4 (about 34% celsian, 66% zirconia) were somewhat stronger at room temperature than samples of composition 9 (about 87% celsian, 13% zirconia) possibly due to the higher zirconia content. Samples of composition 4 fired to 1600° C and 1650° showed behavior more typical of microcracked ceramics than samples fired to the two lower temperatures, in that the rods fired to the higher temperatures were weaker up to quench temperatures of about 400° C but, thereafter up to quench temperatures of 1000° C, were stronger than rods fired to the two lower temperatures. Even the higher fired bodies, however, lost about 50% of their room temperature strength after being quenched from 1000° C. This is a somewhat larger loss than found for the more preferred composition in Example 2 fired to 1650° C.

The higher-celsian composition 9 showed even less evidence of microcracking behavior than the low-celsian composition 4 and therefore approximates one limit of thermal shock resistant compositions of the invention. The rods fired to 1600° C lost only about 40% of their room temperature strength after being quenched from 1000° C but the other rods (including the 1650° C-fired rods lost considerably more strength. Additionally, a rather large drop in strength occurred between the rods quenched from 300° C, 400° C and 500° C, an occurrence which is more typical of ceramic bodies which are not highly microcracked. The strength curves for the composition 9 rods fired to 1500° C, 1500° C and 1650° C were, however, somewhat flatter than the low firing temperature curves in FIG. 2.

The present inventor has selected the range 30–90% celsian and 70–10% zirconia (preferably 40–70% celsian and 30–60% zirconia) because compositions outside of this range do not generally develop sufficient microcracking to significantly benefit the thermal shock resistance of the composition. In addition, the upper limit on zirconia is also a practical limit based on the current price differential between zirconia and the raw materials which yield celsian upon firing.

In the foregoing specification, the material and phase percentages have been given on the weight basis of the raw ceramic batch or of the fired body unless otherwise indicated. The coefficient of thermal expansions are measured and reported for the range room temperature to 1000° C.

I claim:

1. A refractory, thermal shock resistant, sintered ceramic composition consisting essentially of 30–90% celsian and 10–70% zirconia by weight.

2. The sintered ceramic composition of claim 1 wherein the celsian is predominantly in the monoclinic form.

3. The sintered ceramic composition of claim 2 which consists essentially of 40–70% celsian, substantially all the celsian being monoclinic in form, and 30–60% zirconia.

4. A microcracked, sintered ceramic composition having a melting temperature above about 1650° C and consisting essentially of, on the oxide basis by weight, 12.3–36.8% BaO, 8.1–24.5% $Al_2O_3$, 9.6–28.8% $SiO_2$, and 10–70% $ZrO_2$ and having celsian and zirconia as the predominant phases.

5. The microcracked ceramic composition of claim 4 wherein the celsian is predominantly monoclinic in form and makes up 40–70% of the composition, 30–60% being zirconia.

* * * * *